US011030352B2

(12) United States Patent
Hama (10) Patent No.: US 11,030,352 B2
(45) Date of Patent: Jun. 8, 2021

(54) CLEARANCE CHECK METHOD AND CLEARANCE CHECK DEVICE (71) Applicant: FUJITSU LIMITED, Kawasaki (JP)

(72) Inventor: Shinichi Hama, Ebina (JP)

(73) Assignee: FUJITSU LIMITED, Kawasaki (JP)

(*) Notice: Subject to any disclaimer, the term of this patent is extended or adjusted under 35 U.S.C. 154(b) by 576 days.

(21) Appl. No.: 15/791,684

(22) Filed: Oct. 24, 2017

(65) Prior Publication Data
US 2018/0144068 A1 May 24, 2018

(30) Foreign Application Priority Data
Nov. 22, 2016 (JP) .............................. JP2016-227000

(51) Int. Cl.
G06F 17/50 (2006.01)
G06F 30/00 (2020.01)
(Continued)

(52) U.S. Cl.
CPC .............. *G06F 30/00* (2020.01); *G06F 30/17* (2020.01); *G06F 30/398* (2020.01); *G06F 2111/04* (2020.01); *G06F 2111/20* (2020.01)

(58) Field of Classification Search
CPC .. G06F 30/00; G06F 2111/04; G06F 2111/20; G06F 17/50; G06F 9/45;
(Continued)

(56) References Cited

U.S. PATENT DOCUMENTS 5,159,988 A * 11/1992 Gomi ........................ B25J 9/06
180/8.1
5,889,925 A * 3/1999 Tsurutani ............... B25J 9/1687
700/254
(Continued)

FOREIGN PATENT DOCUMENTS

JP 2010-097542 A 4/2010
JP 2012-033064 A 2/2012
(Continued)

OTHER PUBLICATIONS

Office Action dated Nov. 15, 2018, issued in counterpart Korean Application No. 10-2017-0142510, with English translation (9 pages).
(Continued)

*Primary Examiner* — Rehana Perveen
*Assistant Examiner* — Cuong V Luu
(74) *Attorney, Agent, or Firm* — Westerman, Hattori, Daniels & Adrian, LLP (57) ABSTRACT Provided is a non-transitory computer-readable storage medium storing a clearance check program that causes a computer to execute a process, the process including: receiving a setting of a threshold value associated with an attribute and used to check a clearance; storing the set threshold value in a memory; specifying, based on information about an assembly, an attribute of a first component included in the assembly, the information defining where a plurality of components, which are given attributes, are to be arranged; referring to the memory to obtain a threshold value associated with the attribute of the first component; and checking a clearance between the first component and another component included in the assembly based on the obtained threshold value.

11 Claims, 12 Drawing Sheets (51) Int. Cl.
  *G06F 30/17* (2020.01)
  *G06F 30/398* (2020.01)
  *G06F 111/04* (2020.01)
  *G06F 111/20* (2020.01)

(58) Field of Classification Search
  CPC ....... G06F 17/30; G06T 2210/21; G06T 7/60; G06T 2219/2004; G06T 2219/2008; G06T 2210/12; G06T 2219/012; B33Y 50/02; G05G 19/418
  See application file for complete search history.

(56) References Cited

U.S. PATENT DOCUMENTS

| | | | | |
|---|---|---|---|---|
| 6,361,095 | B1* | 3/2002 | Attee | B25B 5/087 294/119.1 |
| 6,625,507 | B1* | 9/2003 | Dickerson | F01D 5/02 700/182 |
| 2004/0003807 | A1* | 1/2004 | Hamilton | B28D 5/029 125/13.01 |
| 2005/0264771 | A1* | 12/2005 | Itou | G05G 1/10 353/101 |
| 2005/0280929 | A1* | 12/2005 | Sim | G11B 15/61 360/85 |
| 2006/0025983 | A1 | 2/2006 | Arbitter et al. | |
| 2011/0005488 | A1* | 1/2011 | Reese | F02M 35/116 123/184.61 |
| 2011/0061039 | A1 | 3/2011 | Kumagai et al. | |
| 2012/0029894 | A1 | 2/2012 | Okutani | |
| 2012/0079445 | A1 | 3/2012 | Ariyama et al. | |
| 2014/0324904 | A1* | 10/2014 | Yamamoto | G06F 30/00 707/769 |
| 2016/0116911 | A1* | 4/2016 | Yamamoto | G05B 19/41805 700/98 |
| 2016/0246293 | A1 | 8/2016 | Sakai et al. | |
| 2017/0066092 | A1* | 3/2017 | Yamamoto | G05B 17/02 |
| 2020/0055301 | A1* | 2/2020 | Markov | G05B 19/4097 |

FOREIGN PATENT DOCUMENTS

| | | |
|---|---|---|
| JP | 2012069000 A | 4/2012 |
| JP | 5120447 B2 | 1/2013 |
| JP | 2016-153956 A | 8/2016 |

OTHER PUBLICATIONS

Extended European Search Report dated Apr. 26, 2018, issued in counterpart European Application No. 17197277.1. (15 pages).
Office Action dated May 10, 2019, issued in counterpart KR Application No. 10-2017-0142510, with English translation. (8 pages).
Office Action dated Oct. 27, 2020, issued in counterpart JP application No. 2016-227000 with English translation. (8 pages).
Office Action dated Nov. 3, 2020, issued in counterpart CN Application No. 201711041240.6, with English translation (18 pages).
Office Action dated Apr. 20, 2021, issued in counterpart EP Application No. 17 197 277.1 (4 pages).

* cited by examiner

ASSEMBLY AFTER DISASSEMBLY

FIG. 2B

ASSEMBLY BEFORE DISASSEMBLY

| COMPONENT IMAGE | LEVEL | COMPONENT ATTRIBUTES ||||
| | | COMPONENT NUMBER | COMPONENT NAME | MATERIAL | PART WHERE COMPONENT IS TO BE USED |
|---|---|---|---|---|---|
|  | 2 | 00001 | TANK | ALUMINUM | ENGINE UNIT |
|  | 2 | 00002 | PIPE | PLASTIC | ENGINE UNIT |
|  | 2 | 00003 | GEAR | IRON | ENGINE UNIT |

| | ITEM NAME | SETTINGS | |
|---|---|---|---|
| 1 | VERSION | 1 (VERSION OF FILE FORMAT) | |
| 2 | TYPE | 0 (SEARCH BY NAME OF COMPONENT) | 1 (SEARCH BY NAME OF ATTRIBUTE) |
| 3 | SEARCH KEY | BLANK | NAME OF ATTRIBUTE |
| 4 | COMPONENT INFORMATION 1 | NAME OF COMPONENT 1 | ATTRIBUTE VALUE 1 |
| 5 | COMPONENT INFORMATION 2 | NAME OF COMPONENT 2 | ATTRIBUTE VALUE 2 |
| 6 | MINIMUM CLEARANCE VALUE | MINIMUM SETTING VALUE (mm) | MINIMUM SETTING VALUE (mm) |
| 7 | MAXIMUM CLEARANCE VALUE | MAXIMUM SETTING VALUE (mm) | MAXIMUM SETTING VALUE (mm) |
| | ⋮ | ⋮ | ⋮ |

\#: REPETITION

FIG. 8A

| | ITEM NAME | SETTINGS |
|---|---|---|
| 1 | VERSION | 1 |
| 2 | TYPE | 1 |
| 3 | SEARCH KEY | COMPONENT NUMBER |
| 4 | COMPONENT INFORMATION 1 | 00001 |
| 5 | COMPONENT INFORMATION 2 | |
| 6 | MINIMUM CLEARANCE VALUE | 4 |
| 7 | MAXIMUM CLEARANCE VALUE | 9 |

FIG. 8B

| | ITEM NAME | SETTINGS |
|---|---|---|
| 1 | VERSION | 1 |
| 2 | TYPE | 1 |
| 3 | SEARCH KEY | COMPONENT NUMBER |
| 4 | COMPONENT INFORMATION 1 | 00001 |
| 5 | COMPONENT INFORMATION 2 | 00002 |
| 6 | MINIMUM CLEARANCE VALUE | 2 |
| 7 | MAXIMUM CLEARANCE VALUE | 7 |
| 8 | COMPONENT INFORMATION 3 | 00001 |
| 9 | COMPONENT INFORMATION 4 | 00003 |
| 10 | MINIMUM CLEARANCE VALUE | 11 |
| 11 | MAXIMUM CLEARANCE VALUE | 14 |

| SPECIFIED TYPE (Type) | COMMENT OF CHECK RESULT |
|---|---|
| 0 | COMPONENT NAME:<br>　　DESCRIBE SETTINGS IN ITEMS FROM ITEM OF NO. 4 IN COMMA-DELIMITED MANNER |
| 1 | NAME OF COMPONENT ATTRIBUTE:<br>　　DESCRIBE SETTINGS IN ITEMS FROM ITEM OF NO. 4 IN COMMA-DELIMITED MANNER |

FIG. 12B

| SPECIFIED TYPE (Type) | COMMENT OF CHECK RESULT |
|---|---|
| 1 | COMPONENT NUMBER: 0001, 0003, 11, 14 |

CLEARANCE CHECK METHOD AND CLEARANCE CHECK DEVICE

CROSS-REFERENCE TO RELATED APPLICATION

This application is based upon and claims the benefit of priority of the prior Japanese Patent Application No. 2016-227000 filed on Nov. 22, 2016, the entire contents of which are incorporated herein by reference.

FIELD

A certain aspect of the embodiments described herein relates to a non-transitory computer-readable storage medium, a clearance check method, and a clearance check device.

BACKGROUND

There has been known a clearance check that determines whether a space with a predetermined distance (hereinafter, referred to as a clearance) is able to be secured between components by using computer aided design (CAD) technology prior to actually assembling a plurality of components. Especially, there has been suggested a technique that assists determining where the plurality of components are to be arranged taking into consideration the attributes of the components such as the amount of heat generation and the weight of the component as disclosed in, for example, Japanese Patent Application Publication No. 2016-153956.

SUMMARY

According to an aspect of the embodiments, there is provided a non-transitory computer-readable storage medium storing a clearance check program that causes a computer to execute a process, the process including: receiving a setting of a threshold value associated with an attribute and used to check a clearance; storing the set threshold value in a memory; specifying, based on information about an assembly, an attribute of a first component included in the assembly, the information defining where a plurality of components, which are given attributes, are to be arranged; referring to the memory to obtain a threshold value associated with the attribute of the first component; and checking a clearance between the first component and another component included in the assembly based on the obtained threshold value.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

The above conventional techniques do not allow to set the clearance values between components with respect to each attribute of the component. Thus, there is a problem that an unnecessarily large clearance is secured despite the fact that it is sufficient if a small clearance is secured between the components depending on the attribute of the component.

The technique described herein has been made in view of those circumstances, and an object thereof is to provide a clearance check program, a clearance check method, and a clearance check device capable of executing a clearance check according to a clearance value set with respect to each attribute of a component.

Hereinafter, a description will be given of an embodiment for carrying out the present case with reference to the accompanying drawings.

Figure 1:
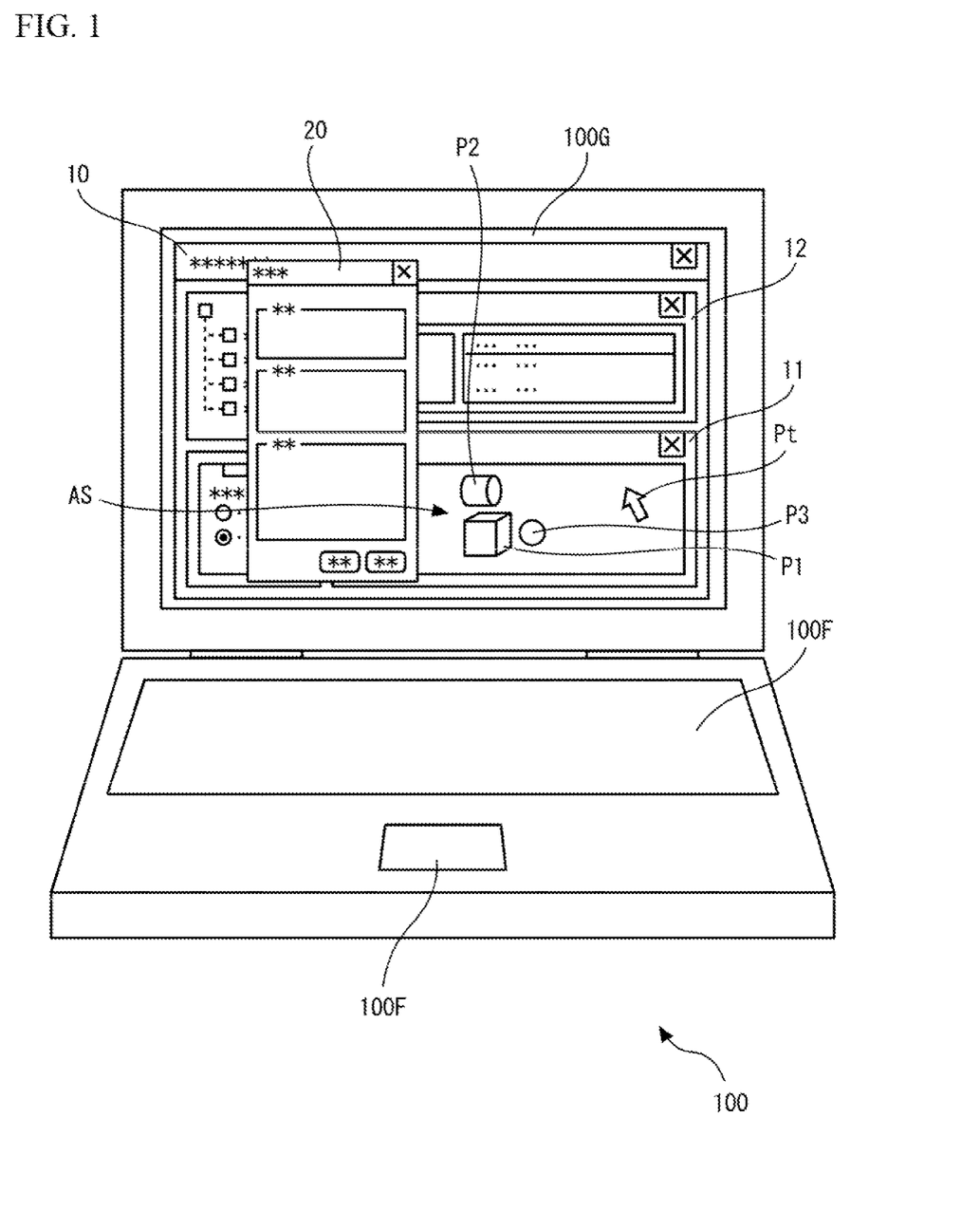
FIG. 1 illustrates an exemplary terminal device.
Figure 2A:
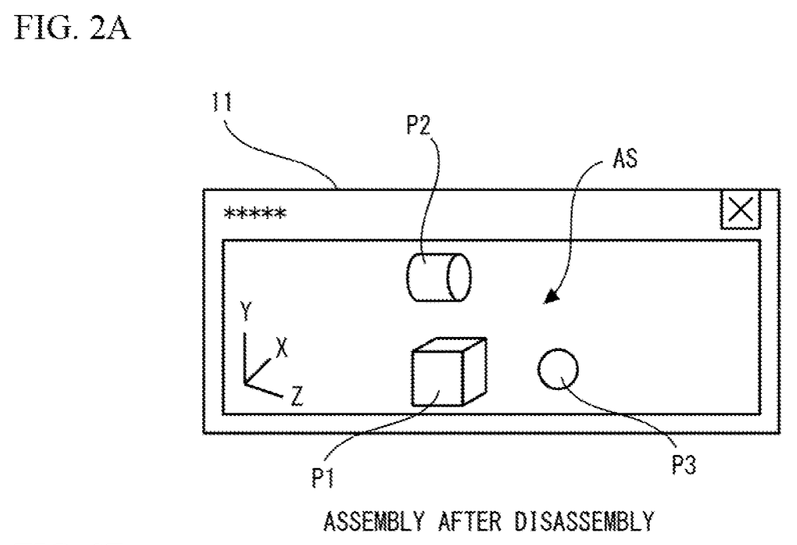
FIG. 2A illustrates an assembly after disassembly.
Figure 2B:
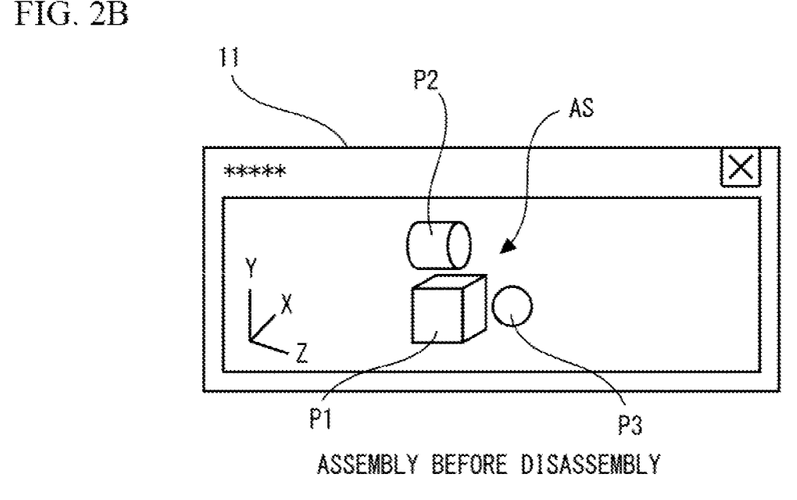
FIG. 2B illustrates the assembly before the disassembly.

FIG. 1 illustrates an exemplary terminal device 100. FIG. 2A illustrates an assembly AS after disassembly. FIG. 2B illustrates the assembly AS before the disassembly. The terminal device 100 as a clearance check device includes an input unit 100F and a display unit 100G. Examples of the input unit 100F include, but are not limited to, a keyboard and a pointing device. Examples of the display unit 100G include, but are not limited to, a liquid crystal display. In FIG. 1, a personal computer (PC) is illustrated as an example of the terminal device 100, but the terminal device 100 is not limited to the PC. For example, the terminal device 100 may be a smart device such as a smartphone or a tablet terminal.

The display unit 100G displays various screens. For example, the display unit 100G displays a main screen 10 and a clearance check screen (hereinafter, simply referred to as a check screen) 20. Especially when a specific operation is conducted to a specific position on the main screen 10 (for example, a position of a specific item in a menu bar), the display unit 100G displays the check screen 20. Here, the main screen 10 includes a plurality of regions 11 and 12. The region 11 is a region for displaying the assembly AS, which includes a plurality of components P1, P2, and P3 as constituent elements, together with XYZ coordinate axes. In FIG. 1, the XYZ coordinate axes are hidden behind the check screen 20. The region 12 is a region for displaying the hierarchical relation among the components P1, P2, and P3 and the assembly AS and the attributes of the components P1, P2, and P3. The main screen 10 also includes a region for selecting the background color of the region 11. The main screen 10 is not the screen of application software fulfilling a three-dimensional CAD function, but is browsing software (a so-called viewer) that visualizes data created by the application software in three dimensions.

Here, when a user places a mouse pointer Pt on the region 11 and then conducts a specific operation by operating the input unit 100F, as illustrated in FIG. 2A, the display unit 100G displays the assembly AS after disassembly into the components P1, P2, and P3 in the region 11. On the other hand, when the user places the mouse pointer Pt on the region 11 and conducts another operation different from the specific operation while the assembly AS after disassembly into the components P1, P2, and P3 is being displayed in the region 11, the display unit 100G displays, as illustrated in FIG. 2B, the assembly AS before disassembly into the components P1, P2, and P3 in the region 11. The specific operation and the another operation may be the same operation. The clearance in the present embodiment represents the clearance between any two of the components P1, P2, and P3 in the assembly AS before disassembly into the components P1, P2, and P3.

When the user moves the mouse pointer Pt onto the check screen 20 by operating the input unit 100F, inputs various setting conditions relating to the clearance check, and then conducts an operation to execute the clearance check, the display unit 100G displays the check results of the clearance check for the clearance between any two of the components P1, P2, and P3. Although the details will be described later, the settings for the clearance check between the components P1 and P2 may be different from or the same as the settings for the clearance check between the components P1 and P3. Alternatively, the settings with a larger clearance value between the settings for the clearance check between the components P1 and P2 and the settings for the clearance check between the components P1 and P3 may be employed.

When the user designates the settings for the clearance check between the components P1 and P2 and the settings for the clearance check between the components P1 and P3 as different settings at the time of the clearance check, the clearance check between the components P1 and P2 and the clearance check between the components P1 and P3 are individually executed. Thus, an unnecessarily large clearance is not secured between the components P1 and P2 or between the components P1 and P3. Hereinafter, the detailed configuration and operation of the terminal device 100 will be described.

Figure 3:
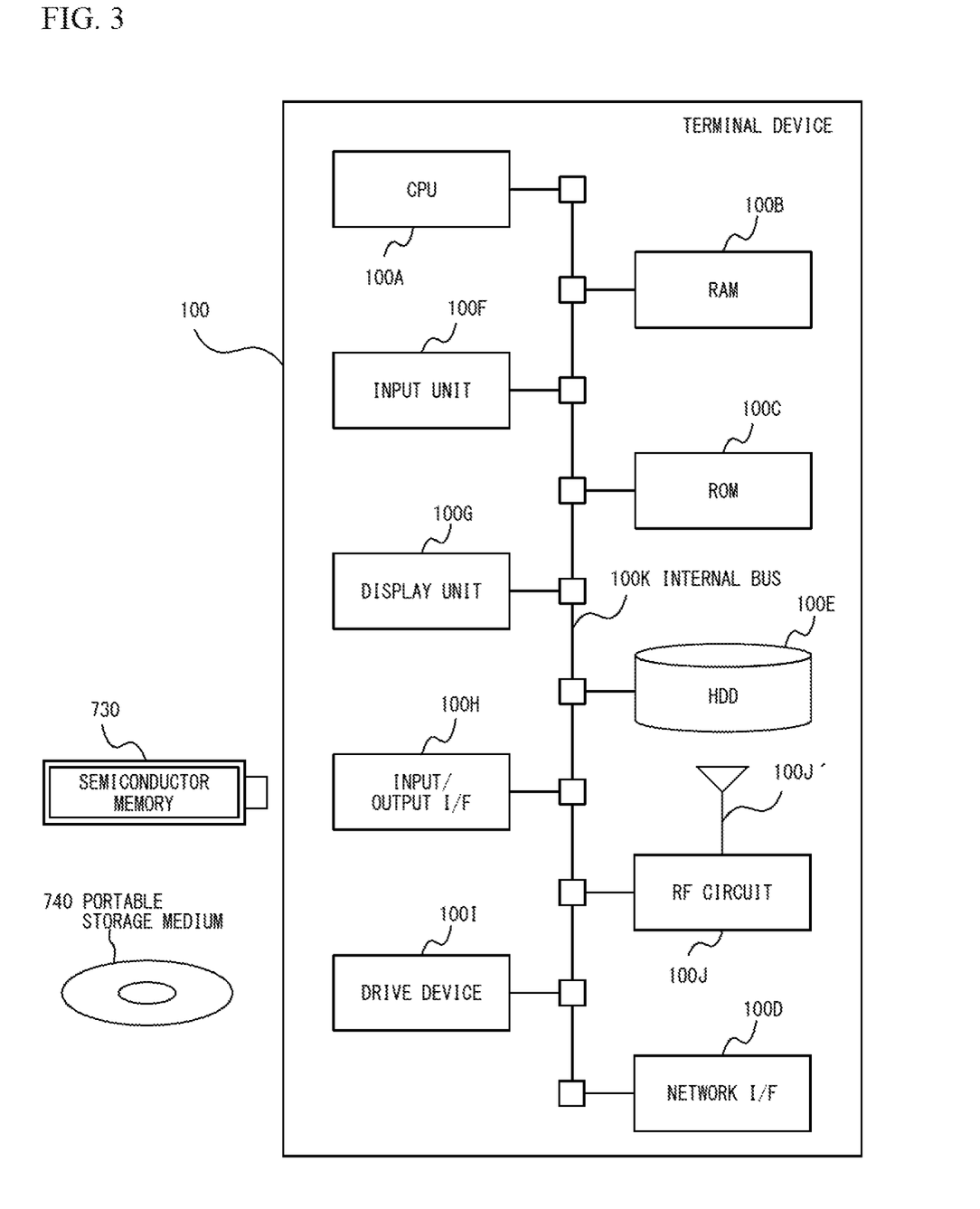
FIG. 3 illustrates a hardware configuration of the terminal device.

With reference to FIG. 3, a hardware configuration of the terminal device 100 will be described.

FIG. 3 illustrates a hardware configuration of the terminal device 100. As illustrated in FIG. 3, the terminal device 100 includes at least a central processor (CPU) 100A, a random access memory (RAM) 100B, a read only memory (ROM) 100C, and a network interface (I/F) 100D. As described above, the terminal device 100 also includes the input unit 100F and the display unit 100G.

The terminal device 100 may further include at least one of a hard disk drive (HDD) 100E, an input/output I/F 100H, a drive device 100I, and a radio frequency (RF) circuit 100J as necessary. The CPU 100A through the RF circuit 100J are interconnected through an internal bus 100K. The cooperation of at least the CPU 100A and the RAM 100B achieves a computer.

A semiconductor memory 730 is coupled to the input/output I/F 100H. Examples of the semiconductor memory 730 include, but are not limited to, a universal serial bus (USB) memory and a flash memory. The input/output I/F 100H reads programs and data stored in the semiconductor memory 730. The input/output/F 100H includes, for example, a USB port.

A portable storage medium 740 is inserted into the drive device 100I. Examples of the portable storage medium 740 include, but are not limited to, removal discs such as compact disc (CD)-ROMs and digital versatile discs (DVDs). The drive device 100I reads programs and data stored in the portable storage medium 740.

An antenna 100J' is coupled to the RF circuit 100J. Instead of the RF circuit 100J, a CPU implementing communication functions may be used. The network IF 100D includes, for example, a local area network (LAN) port.

The CPU 100A stores the programs stored in the HDD 100E in the aforementioned RAM 100B. The CPU 100A stores the programs stored in the portable storage medium 740 in the RAM 100B. The execution of the stored programs by the CPU 100A implements the various functions described later, and causes various operations to be executed. The programs are written according to the flowcharts described later.

A description will next be given of the function of the terminal device 100 with reference to FIG. 4 through FIG. 8B.

Figure 4:
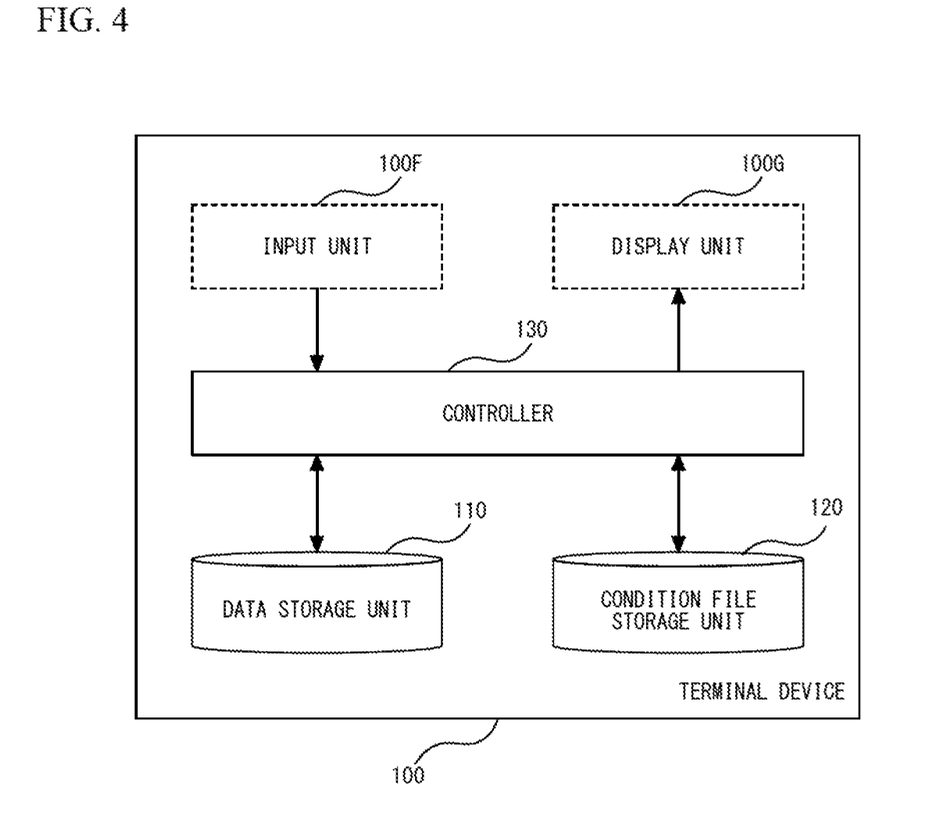
FIG. 4 is a functional block diagram of the terminal device.
Figure 5:
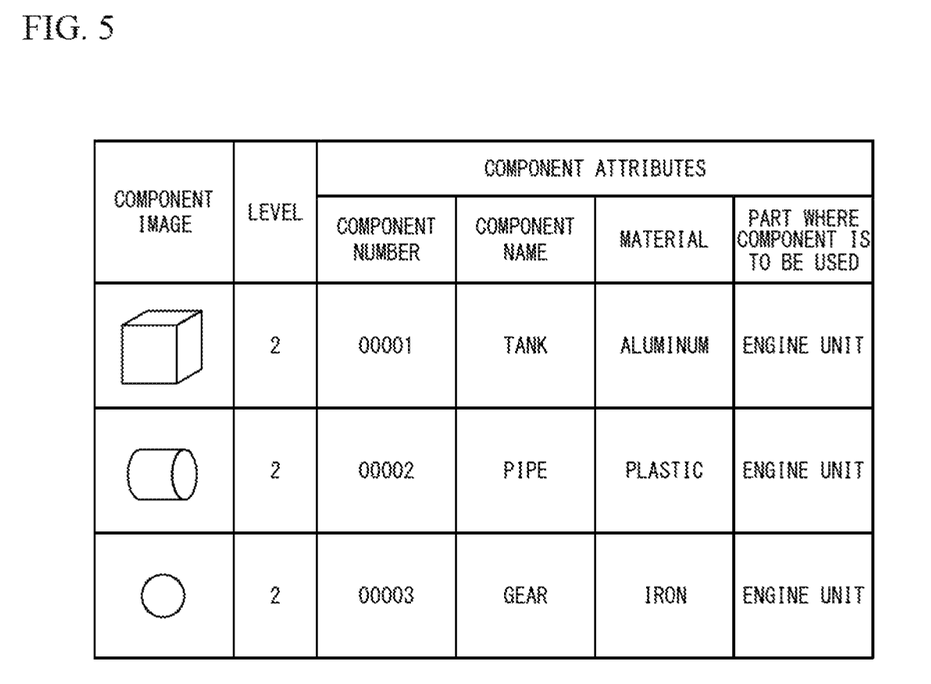
FIG. 5 illustrates an example of component data.
Figure 6:
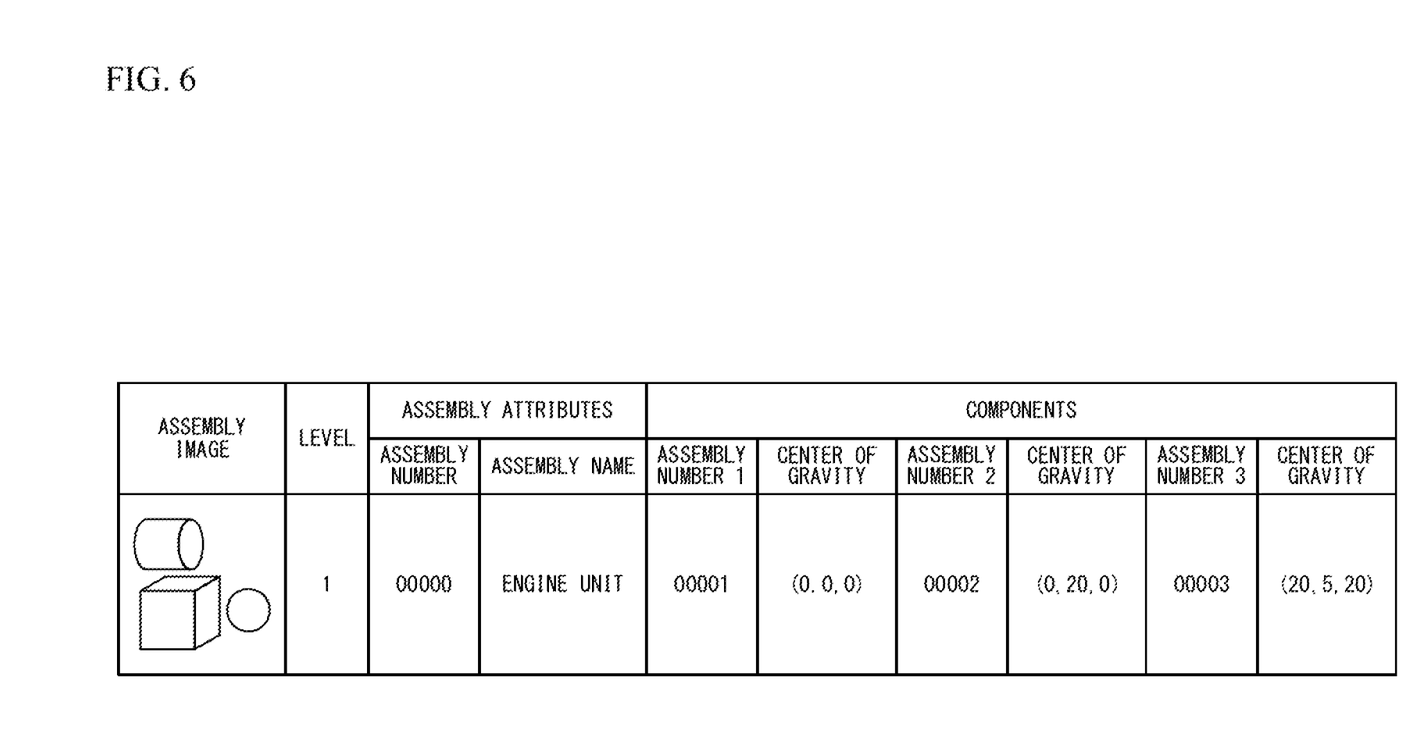
FIG. 6 illustrates an example of assembly data.
Figure 7:
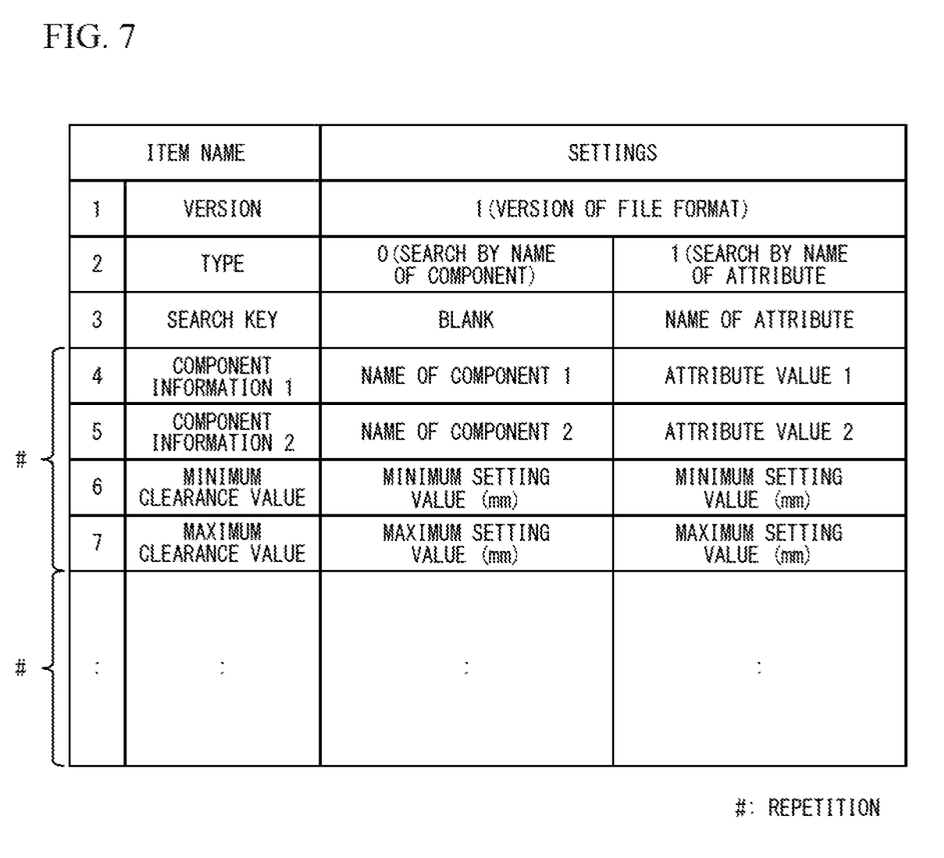
FIG. 7 illustrates an example of a file format of a condition file.
Figure 8A:
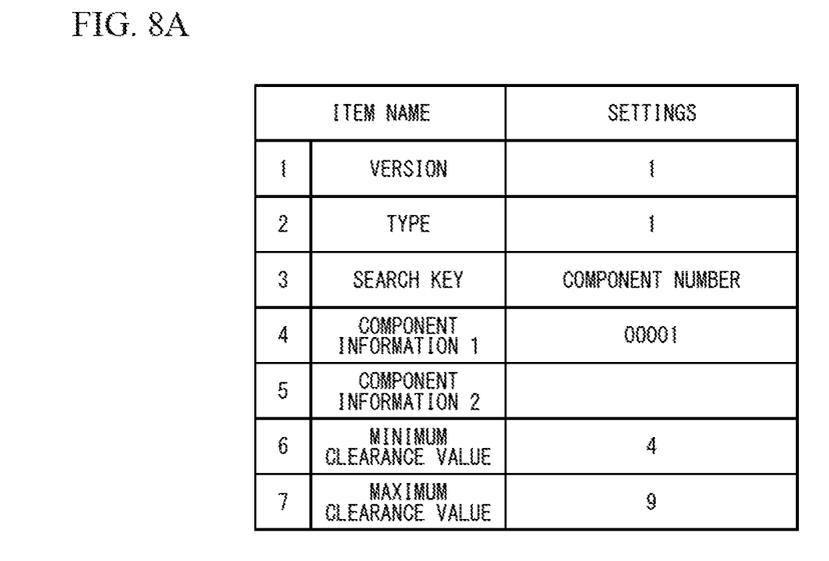
FIG. 8A illustrates an example of the condition file.
Figure 8B:
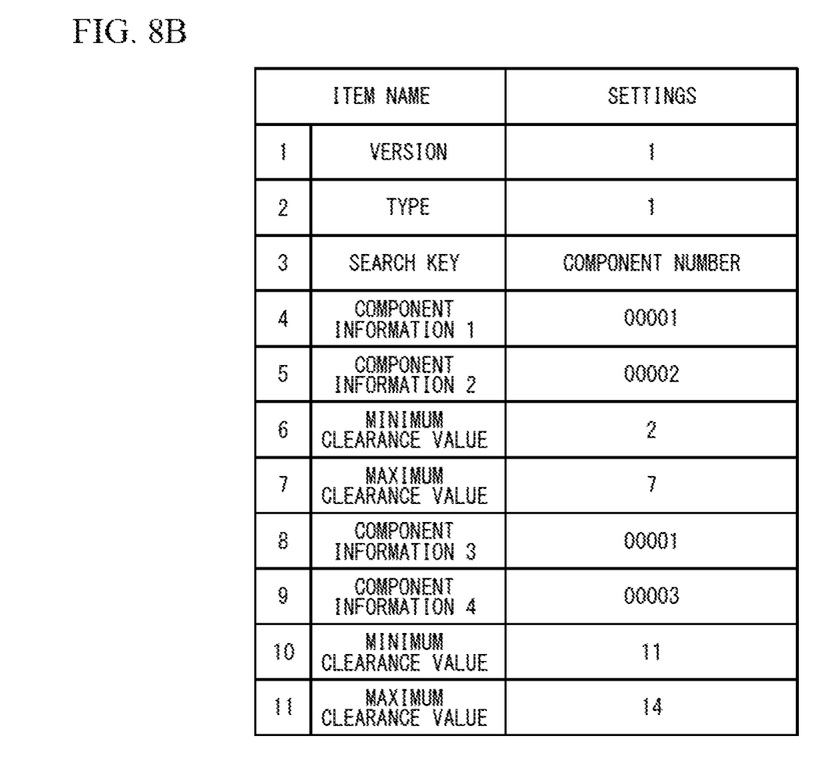
FIG. 8B illustrates another example of the condition file.

FIG. 4 is a functional block diagram of the terminal device 100. FIG. 5 illustrates an example of component data. FIG. 6 illustrates an example of assembly data. FIG. 7 illustrates an example of the file format of a condition file. FIG. 8A illustrates an example of the condition file. FIG. 8B illustrates another example of the condition file.

As illustrated in FIG. 4, the terminal device 100 includes a data storage unit 110, a condition file storage unit 120, and a controller 130 as a processor. Since the input unit 100F and the display unit 100G are hardware devices, they are indicated by dashed lines. The data storage unit 110 and the condition file storage unit 120 are implemented by, for example, the aforementioned RAM 100B or HDD 100E. The controller 130 is implemented by the aforementioned CPU 100A.

The data storage unit 110 stores various data managed by a Product Data Management (PDM) system. For example, the data storage unit 110 stores component data. The component data includes, as illustrated in FIG. 5, a component image, a level, and component attributes as constituent elements. The component image represents, for example, the image of each of the components P1, P2, and P3. The component image is an image expressed based on three-dimensional CAD data. The level represents the level at which each of the components P1, P2, and P3 is used. For example, the level "2" is given to the components P1, P2, and P3 that are terminal components. Although details will be described later, the level "1" is given to the assembly AS other than the terminal components. The component attributes represent the attributes of each of the components P1, P2, and P3. The component attributes include, as constituent elements, a component number for identifying each of the components P1, P2, and P3, a component name representing the name of each of the components P1, P2, and P3, the material of each of the components P1, P2, and P3, and a part where each of the components P1, P2, and P3 is to be used. The various data are not necessarily managed by the PDM system, and may be data not managed by the PDM system.

The data storage unit 110 also stores, for example, assembly data. As illustrated in FIG. 6, the assembly data includes, as constituent elements, an assembly image, a level, assembly attributes, and components. The assembly image represents, for example, the image of the assembly AS. The assembly image is also an image expressed based on three-dimensional CAD data. The level represents the level where the assembly AS is used. The assembly attributes represent the attributes of the assembly AS. The assembly attributes include, as constituent elements, an assembly number for identifying the assembly AS and an assembly name representing the name of the assembly AS. The components include the component number and the center of gravity of each of the components P1, P2, and P3 constituting the assembly AS. The center of gravity is specified by the coordinate positions in the XYZ coordinate axes. The assembly data defines the positional relations between the components P1, P2, and P3 and the assembly AS. Based on the assembly data, for example, the component P2 of which the component number is "00002" is arranged at the position above the component P1 of which the component number is "00001", and the component P3 of which the component number is "00003" is arranged at the position lateral to the component P1 of which the component number is "00001".

The condition file storage unit 120 stores condition file. The condition file is an electronic file that specifies a clearance value between any two of the components P1, P2, and P3. The format of the condition file may be a comma separated values (CSV) format, or other format. The file format of the condition file is preliminarily determined as illustrated in FIG. 7. For example, the search type can be specified by the item of No. 2 of the file format. When the type "0" is specified, executed is the clearance check between the component having the name of the component 1 specified in the item of No. 4 and the component having the name of the component 2 specified in the item of No. 5. When the type "1" is specified, the name of the attribute specified in the item of No. 3 is specified. Then, executed is the clearance check between the component having the attribute value 1, which is according to the name of the attribute, specified in the item of No. 4 and the component having the attribute value 2, which is according to the name of the attribute, specified in the item of No. 5. Even in the case of the type "0" or the type "1", both the minimum clearance value specified in the item of No. 6 and the maximum clearance value specified in the item of No. 7 are set as threshold values. The items from the item No. 4 to the item No. 7 are repeated after the item No. 7.

The use of the file format defined as described above enables to set various setting values in the condition file as illustrated in FIG. 8A and FIG. 8B. For example, as illustrated in FIG. 8A, the user sets the string "component number", which is one of the names of the component attributes, as a search key, and sets the component number "00001" as the component information 1. On the other hand, the user does not set a specific component number as the component information 2 (maintains the state of blank). In this case, executed is the clearance check to check whether a clearance ranging from the minimum clearance value "4" mm to the maximum clearance value "9" mm is secured between the component P1, of which the component number is "00001", and each of all the other components P2 and P3 constituting the assembly AS except the component P1.

In addition, as illustrated in FIG. 8B, the user sets the string "component number", which is one of the names of the component attributes, as a search key, sets the component number "00001" as the component information 1, and the component number "00002" as the component information 2. Then, the user sets the component number "00001" as the component information 3, and sets the component number "00003" as the component information 4. In this case, executed is the clearance check to check whether a clearance ranging from the minimum clearance value "2" mm to the maximum clearance value "7" mm is secured between the component P1 of which the component number is "00001" and the component P2 of which the component number is "00002". Also executed is the clearance check to check whether a clearance ranging from the minimum clearance value "11" mm and the maximum clearance value "14" mm is secured between the component P1 of which the component number is "00001" and the component P3 of which the component number is "00003". As described above, in the present embodiment, the clearance check according to the clearance value set with respect to each attribute of the component is executed.

Furthermore, in the condition file illustrated in FIG. 8A, for example, the user sets the string "material" as a search key instead of the string "component number", and sets the material "aluminum" as the component information 1 instead of the component number "00001". On the other hand, the user does not set a specific material as the component information 2. In this case, executed is the clearance check to check whether a clearance ranging from the minimum clearance value "4" mm to the maximum clearance value "9" mm is secured between the material "aluminum" and each of all the other materials constituting the assembly AS except the material "aluminum". As described above, the threshold values can be collectively set by the attribute of the component such as a material instead of individual components.

When the component number is not set as the component information 2 in the condition file illustrated in FIG. 8B, as described with reference to FIG. 8A, the clearance check between the component P1 of which the component number is "00001" and each of all the other components P2 and P3 is specified. On the other hand, the conditions set in the items of No. 7 through No. 11 of the condition file specify the clearance check between the component P1 of which the component number is "00001" and the component P3 of which the component number is "00003". In this case, the conditions specified in the anterior items in the condition file may be employed as a condition with higher priority. Thus, in the clearance check between the component P1 of which the component number is "00001" and the component P3 of which the component number is "00003", it is determined whether a clearance ranging from the minimum clearance value "2" mm to the maximum clearance value "7" mm is secured. As described above, depending on the setting location of the setting content, the user can specify which clearance check of the clearance values between each two of the components P1, P2, and P3 is prioritized. The priority of the condition may be separately set in the condition file. Alternatively, the priority of the condition may be set in a priority file different from the condition file, and the condition file may refer to the priority file.

Referring back to FIG. 4, the controller 130 controls various operations executed by the terminal device 100. For example, the controller 130 displays the main screen 10 and the check screen 20 on the display unit 100G in response to the input from the input unit 100F. For example, when receiving an operation to a specific position on the check screen 20, the controller 130 executes the clearance check.

A description will next be given of the operation of the terminal device 100 with reference to FIG. 9 through FIG. 12.

Figure 9:
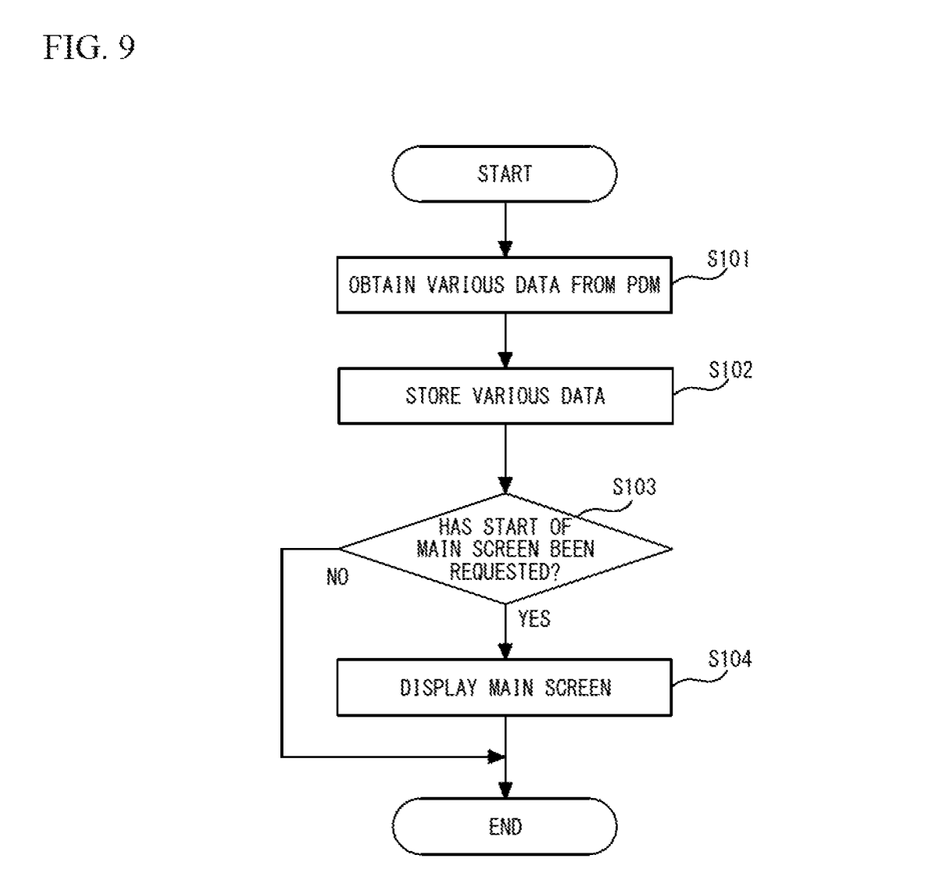
FIG. 9 is a flowchart of an exemplary operation of the terminal device.

FIG. 9 is a flowchart of an exemplary operation of the terminal device 100. The controller 130 obtains various data from the PDM system (not illustrated) (step S101), and the data storage unit 110 stores the various data obtained by the controller 130 (step S102). More specifically, the controller 130 obtains the component data (see FIG. 5) and the assembly data (see FIG. 6) from the PDM system, and stores them in the data storage unit 110. Accordingly, the data storage unit 110 stores the component data and the assembly data. The terminal device 100 and the PDM system are interconnected through a communication network such as a local area network (LAN) or the Internet, and the terminal device 100 obtains various data such as the component data and the assembly data from the PDM system by using a wired communication function or a wireless communication function.

Then, the controller 130 determines whether a start of the main screen 10 has been requested (step S103). When a start of the main screen 10 has been requested (step S103: YES), the controller 130 displays the main screen 10 on the display unit 100G (step S104), and ends the process. For example, when a specific operation is conducted to a thumbnail image for instructing a start of the main screen 10 arranged on a desktop screen or a home screen displayed by the display unit 100G, the controller 130 determines that a start of the main screen 10 has been requested, and displays the main screen 10 on the display unit 100G. When a start of the main screen 10 is not requested (step S103: NO), the controller 130 skips the process of step S104, and ends the process.

Figure 10:
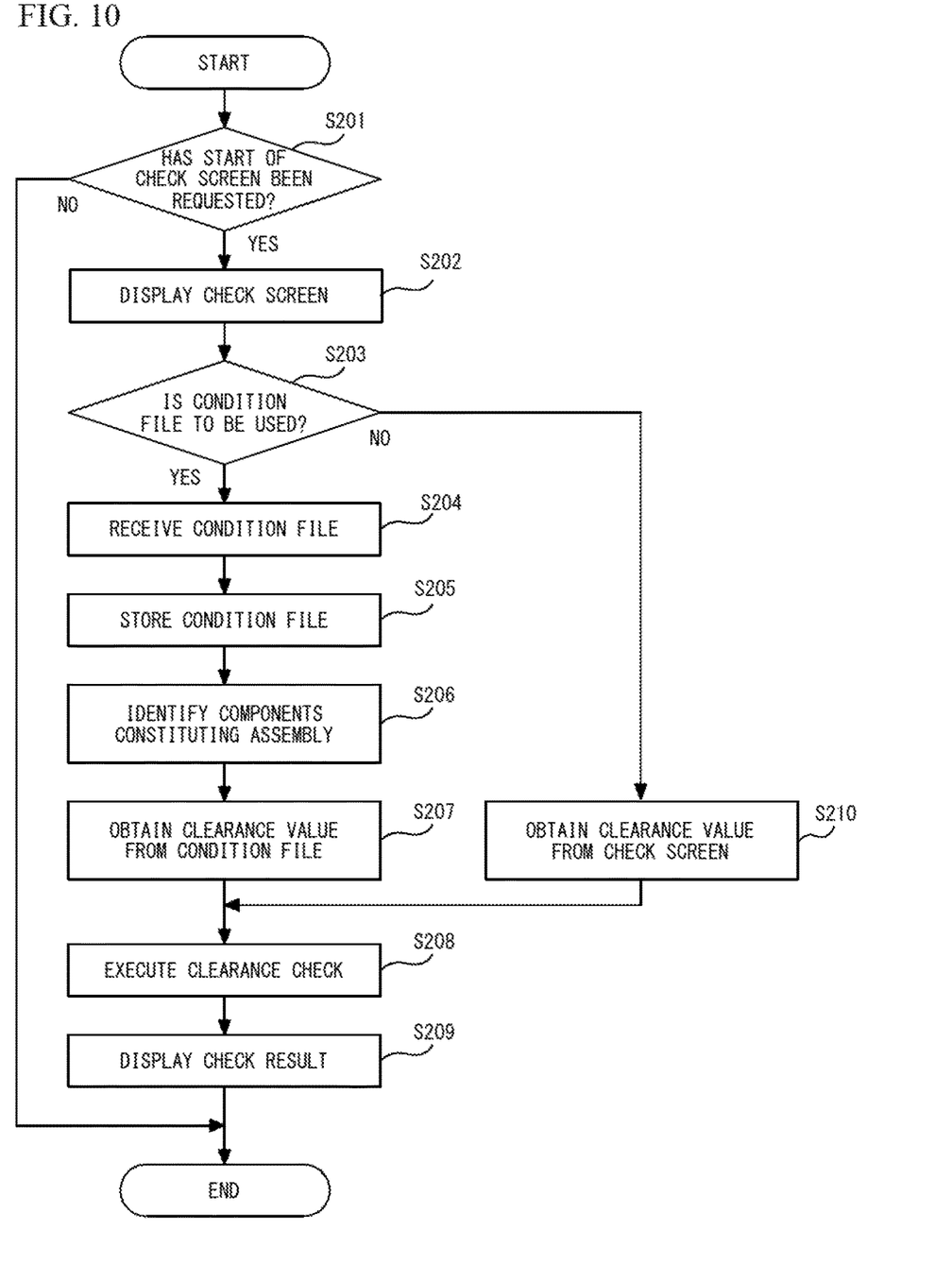
FIG. 10 is a flowchart of another exemplary operation of the terminal device.
Figure 11:
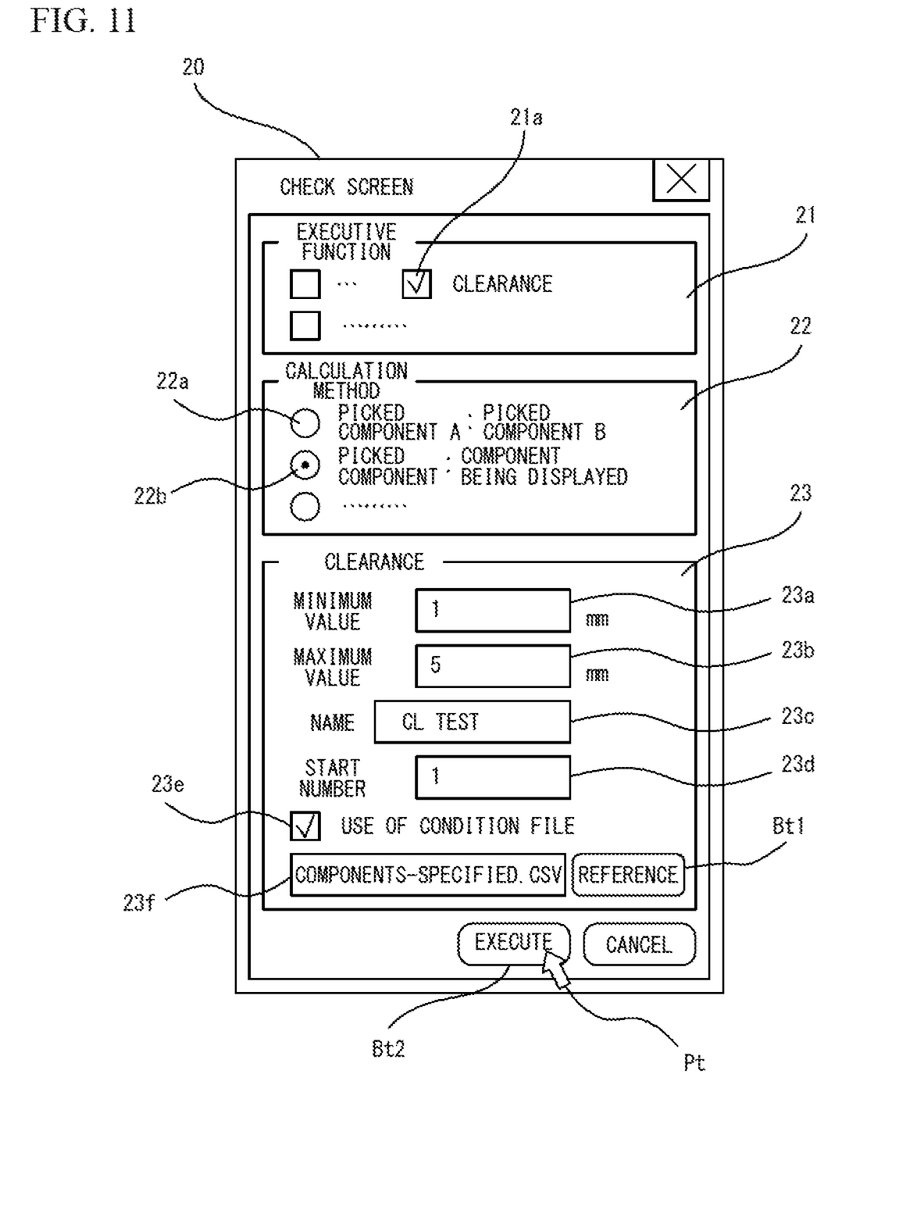
FIG. 11 illustrates an example of a check screen.
Figure 12A:
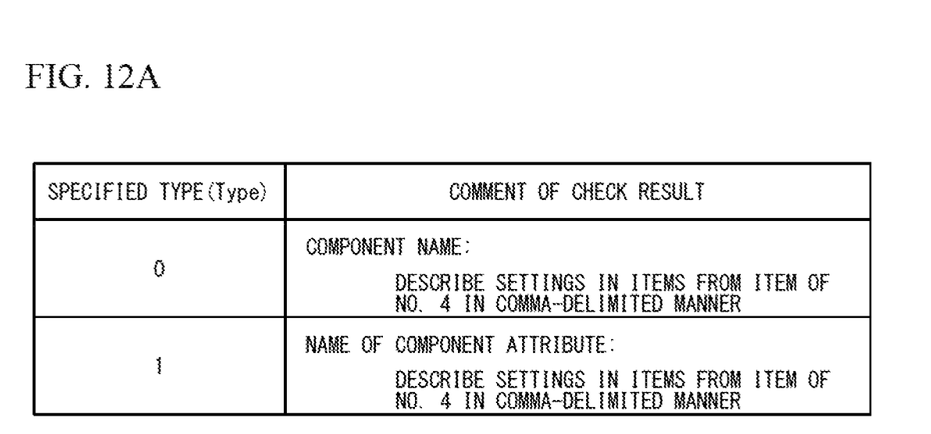
FIG. 12A illustrates a file format of a check result.
Figure 12B:
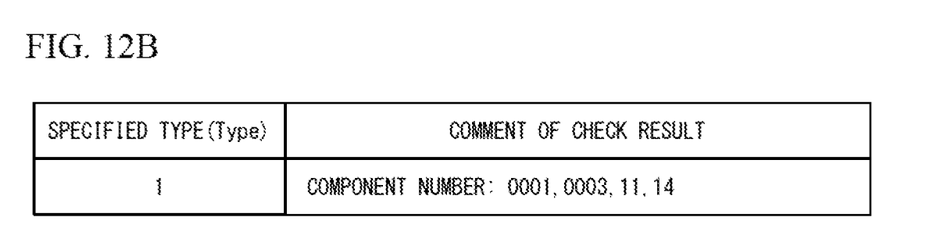
FIG. 12B is an example of the check result.

FIG. 10 is a flowchart of another operation of the terminal device 100. FIG. 11 illustrates an example of the check screen 20. FIG. 12A illustrates a file format of the check result. FIG. 12B illustrates an example of the check result.

As illustrated in FIG. 10, the controller 130 determines whether a start of the check screen 20 has been requested (step S201). When a start of the check screen 20 has been requested (step S201: YES), the controller 130 displays the check screen 20 (step S202). For example, when a specific operation is conducted to a specific position on the main screen 10 displayed by the display unit 100G (for example, the position of a specific item in a menu bar), the controller 130 detects the specific operation, and displays the check screen 20 on the display unit 100G. When a start of the check screen 20 is not requested (step S201: NO), the controller 130 ends the process.

Here, the check screen 20 includes a plurality of regions 21, 22, and 23 as illustrated in FIG. 11. The region 21 is a region for setting an executive function. For example, when the user wants to execute the clearance check, the execution of the clearance check is set by selecting a corresponding check box 21a. The region 22 is a region for setting a calculation method. For example, when two components are specified from the assembly AS included in the region 11 (see FIG. 1) of the main screen 10, and the clearance check between the specified two components is to be executed, the clearance check between the specified components is executed by selecting a radio button 22a. For example, when one component is specified from the assembly AS included in the region 11, and the clearance check between the specified one component and each of all the other components included in the region 11 is to be executed, the clearance check between the specified component and each of all the other components is executed by selecting a radio button 22b.

The region 23 is a region relating to clearance settings. The region 23 includes an entry field 23a for inputting the minimum value of the clearance value, an entry field 23b for inputting the maximum value of the clearance value, an entry field 23c for inputting the name of the clearance check, and an entry field 23d for inputting a start number of the clearance check. The region 23 also includes a check box 23e for selecting the use of the condition file and a display field 23f for displaying the file name of the condition file.

When the user wants to execute a clearance check using the condition file, the use of the condition file is set by selecting the check box 23e. When detecting the selection of the check box 23e, the controller 130 controls a reference button Bt1 to be able to be pressed. When the user presses the reference button Bt1 and selects one condition file from one or a plurality of condition files included in the displayed screen region (not illustrated), the selected condition file is reflected and displayed on the display field 23f. In this manner, the condition file to be used is finalized.

Furthermore, when the user executes various settings on the check screen 20 and then executes the clearance check, the user operates the input unit 100F, overlaps the mouse pointer Pt with an execution button Bt2, and presses the execution button Bt2. When detecting the press of the execution button Bt2, the controller 130 starts executing the clearance check.

When starting the execution of the clearance check, the controller 130 determines whether the condition file is to be used as illustrated in FIG. 10 (step S203). More specifically, the controller 130 determines whether the check box 23e is selected in the check screen 20. When the condition file is to be used (step S203: YES), the controller 130 receives the condition file (step S204), and the condition file storage unit 120 stores the condition file received by the controller 130 (step S205). More specifically, the controller 130 receives the condition file and stores the condition file in the data storage unit 110, thereby causing the condition file storage unit 120 to store the condition file.

Upon the completion of the processing of step S205, the controller 130 identifies the components P1, P2, and P3 constituting the assembly AS (step S206). More specifically, the controller 130 specifies the attributes of the components P1, P2, and P3 constituting the assembly AS based on the assembly data stored in the data storage unit 110. The attribute specified by the controller 130 may be the component number, or may be the component name or the material when the assembly data includes the component name or the material instead of the component number.

Upon the completion of the processing of step S206, the controller 130 obtains the clearance value from the condition file (step S207). More specifically, the controller 130 checks the settings of the condition file based on the specified attributes (for example, the component number, the component name, the material, or the like) of the components P1, P2, and P3, and obtains the minimum clearance value and the maximum clearance value according to the attributes.

Upon the completion of the processing of step S207, the controller 130 executes the clearance check (step S208). More specifically, the controller 130 executes the clearance check between any two of the components P1, P2, and P3 for which the minimum clearance value and maximum clearance value are set based on the obtained minimum clearance value and the obtained maximum clearance value. For example, when the component number "00001" is set in the item of No. 4 of the condition file and the component number is not set in the item of No. 5 (see FIG. 8A), the controller 130 executes the clearance check between the component P1 and all the other components P2 and P3 included in the assembly AS. For example, when the component number "00001" is set in the item of No. 4 of the condition file and the component number "00002" is set in the item of No. 5 (see FIG. 8B), the controller 130 executes the clearance check between the component P1 and the component P2. Furthermore, when the component number "00001" is set in the item of No. 8 of the condition file and the component number "00003" is set in the item of No. 9 (see FIG. 8B), the controller 130 also executes the clearance check between the component P1 and the component P3.

Upon the completion of the processing of step S208, the controller 130 displays the check result on the display unit 100G (step S209), and ends the process. The check result differs depending on the type set in the item of No. 2 of the condition file as illustrated in FIG. 12A. For example, when the type "0" is set in the item of No. 2 of the condition file, the controller 130 displays the screen of the check result including comments, which describe the string "component name" and the settings specified in the items after the item of No. 4 with respect to each component name, on the display unit 100G in a comma-delimited manner. For example, when the type "I" is set in the item of No. 2 of the condition file, the controller 130 displays the screen of the check result including comments, which describes the string representing the name of the component attribute (e.g., "component number") and the settings specified in the items after the item of No. 4 with respect to each name of the component attributes, on the display unit 100G in a comma-delimited manner. Accordingly, when the clearance check ends, the check result including the comments is displayed on the display unit 100G as illustrated in FIG. 12B.

The controller 130 may display the check result when the clearance value between any two of the components P1, P2, and P3 is included between the minimum clearance value and the maximum clearance value. Alternatively, the controller 130 may display the check result when the clearance value between any two of the components P1, P2, and P3 is not included between the minimum clearance value and the maximum clearance value. In the former case, the user is able to know components between which the clearance is secured among the components P1, P2, and P3. In the latter case, the user is able to know components between which the clearance is not secured among the components P1, P2, and P3.

Referring back to FIG. 10, when the condition file is not to be used at step S203 (step S203: NO), the controller 130 obtains the clearance value from the check screen 20 (see FIG. 11) (step S210). More specifically, the controller 130 obtains the minimum value of the clearance value input in the entry field 23a and the maximum value of the clearance value input in the entry field 23b. Upon the completion of the processing of step S210, the controller 130 executes the processes of step S208 and step S209, and ends the process. When there is a component that is not set in the condition file, the controller 130 obtains the clearance value for the component from the check screen 20.

As described above, in the present embodiment, the terminal device 100 includes the controller 130. The controller 130 receives the condition file and stores the condition file in the condition file storage unit 120. Additionally, the controller 130 specifies the attribute of at least one of the components P1, P2, and P3 included in the assembly AS based on the assembly data that defines where the components P1, P2, and P3, which are given attributes, are to be located. Furthermore, the controller 130 obtains the minimum clearance value and the maximum clearance value associated with the attribute of at least one of the components P1, P2, and P3 by referring to the condition file storage unit 120. Then, the controller 130 executes the clearance check between one of the component P1, P2, and P3 and at least one of the remaining components of the components P1, P2, and P3 included in the assembly AS based on the obtained minimum clearance value and the obtained maximum clearance value. This configuration allows for the execution of the clearance check according to the minimum clearance value and the maximum clearance value set with respect to each attribute of the components P1, P2, and P3. The present embodiment especially has technical advantages that unnecessary detection results, resulting from the execution of the clearance check between any two of the components P1, P2, and P3 included in the assembly AS based on a uniform threshold value, are reduced.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention. For example, a wild card may be used for the setting values or one or some of the setting values set in the condition file.

What is claimed is:

1. A non-transitory computer-readable storage medium storing a clearance check program that causes a computer to execute a process, the process comprising:
    receiving, via a user interface, a setting of a threshold value associated with a combination of an attribute name of a component and an attribute value of the component, the threshold value being used to check a clearance distance, the attribute name indicating a category of the attribute value;
    storing the set threshold value in a memory;
    specifying, based on information regarding a CAD-based assembly model, a combination of a first attribute name and a first attribute value of a first component included in the CAD-based assembly model, the information defining where a plurality of components, which are given combinations of attribute names and attribute values, are arranged in the CAD-based assembly model;
    referring to the memory to obtain a first threshold value associated with the combination of the first attribute name and the first attribute value of the first component; and
    checking a clearance distance between a first center of gravity of the first component and a second center of gravity of another component included in the CAD-based assembly model in accordance with the obtained first threshold value.

2. The non-transitory computer-readable storage medium according to claim 1, wherein
    the process further comprises specifying a combination of an attribute name and an attribute value of the another component, and
    the checking of the clearance distance includes checking the clearance distance in accordance with the first threshold value according to a combination of the combination of the first attribute name and the first attribute value of the first component and the combination of the attribute name and the attribute value of the another component.

3. The non-transitory computer-readable storage medium according to claim 1, wherein
    each of the first attribute name of the first component and the attribute name of the another component includes at least one of a name of a component, a material of the component, and a part where the component is to be used.

4. The non-transitory computer-readable storage medium according to claim 1, wherein
    the process further comprises, when a plurality of first threshold values associated with the combination of the first attribute name and the first attribute value of the first component are detected, checking the clearance distance between the first center of gravity of the first component and the second center of gravity of the another component in accordance with a threshold value with highest priority among the detected plurality of first threshold values.

5. The non-transitory computer-readable storage medium according to claim 1, wherein
the process further comprises, when a second threshold value associated with a combination of a second attribute name and a second attribute value of a second component included in the CAD-based assembly model is not obtained at a time of checking a clearance distance for the second component, checking a clearance distance between a third center of gravity of the second component and a fourth center of gravity of a component other than the second component in accordance with a third threshold value specified at a time of receiving an execution instruction of a check for the clearance distance.

6. A clearance check method implemented by a computer, the clearance check method comprising:
receiving, via a user interface, a setting of a threshold value associated with a combination of an attribute name of a component and an attribute value of the component, the threshold value being used to check a clearance distance, the attribute name indicating a category of the attribute value;
storing the set threshold value in a memory;
specifying, based on information regarding a CAD-based assembly model, a combination of a first attribute name and a first attribute value of a first component included in the CAD-based assembly model, the information defining where a plurality of components, which are given combinations of attribute names and attribute values, are arranged in the CAD-based assembly model;
referring to the memory to obtain a first threshold value associated with the combination of the first attribute name and the first attribute value of the first component; and
checking a clearance distance between a first center of gravity of the first component and a second center of gravity of another component included in the CAD-based assembly model in accordance with the obtained first threshold value.

7. A clearance check device comprising:
a memory; and
a processor coupled to the memory and configured to:
receive, via a user interface, a setting of a threshold value associated with a combination of an attribute name of a component and an attribute value of the component, the threshold value being used to check a clearance distance, the attribute name indicating a category of the attribute value;
store the set threshold value in the memory;
specify, based on information regarding a CAD-based assembly model, a combination of a first attribute name and a first attribute value of a first component included in the CAD-based assembly model, the information defining where a plurality of components, which are given combinations of attribute names and attribute values, are arranged in the CAD-based assembly model;
refer to the memory to obtain a first threshold value associated with the combination of the first attribute name and the first attribute value of the first component; and
check a clearance distance between a first center of gravity of the first component and a second center of gravity of another component included in the CAD-based assembly model in accordance with the obtained first threshold value.

8. The clearance check device according to claim 7, wherein the processor is further configured to:
specify a combination of an attribute name and an attribute value of the another component, and
check the clearance distance in accordance with the first threshold value according to a combination of the combination of the first attribute name and the first attribute value of the first component and the combination of the attribute name and the attribute value of the another component.

9. The clearance check device according to claim 7, wherein
each of the first attribute name of the first component and the attribute name of the another component includes at least one of a name of a component, a material of the component, and a part where the component is to be used.

10. The clearance check device according to claim 7, wherein the processor is further configured to:
when a plurality of first threshold values associated with the combination of the first attribute name and the first attribute value of the first component are detected, check the clearance distance between the first center of gravity of the first component and the second center of gravity of the another component in accordance with a threshold value with highest priority among the detected plurality of first threshold values.

11. The clearance check device according to claim 7, wherein the processor is further configured to:
when a second threshold value associated with a combination of a second attribute name and a second attribute value of a second component included in the CAD-based assembly model is not obtained at a time of checking a clearance distance for the second component, check a clearance distance between a third center of gravity of the second component and a fourth center of gravity of a component other than the second component in accordance with a third threshold value specified at a time of receiving an execution instruction of a check for the clearance distance.

* * * * *